Jan. 8, 1952  G. M. MYRMIRIDES  2,581,551
MEANS FOR POWERING VEHICLES
Filed April 14, 1948  2 SHEETS—SHEET 1
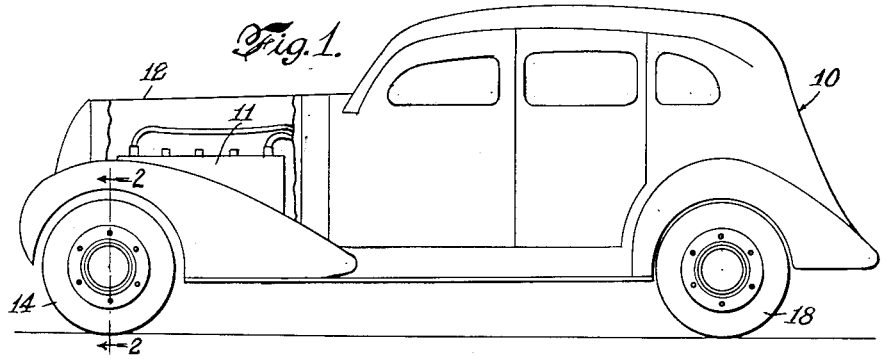
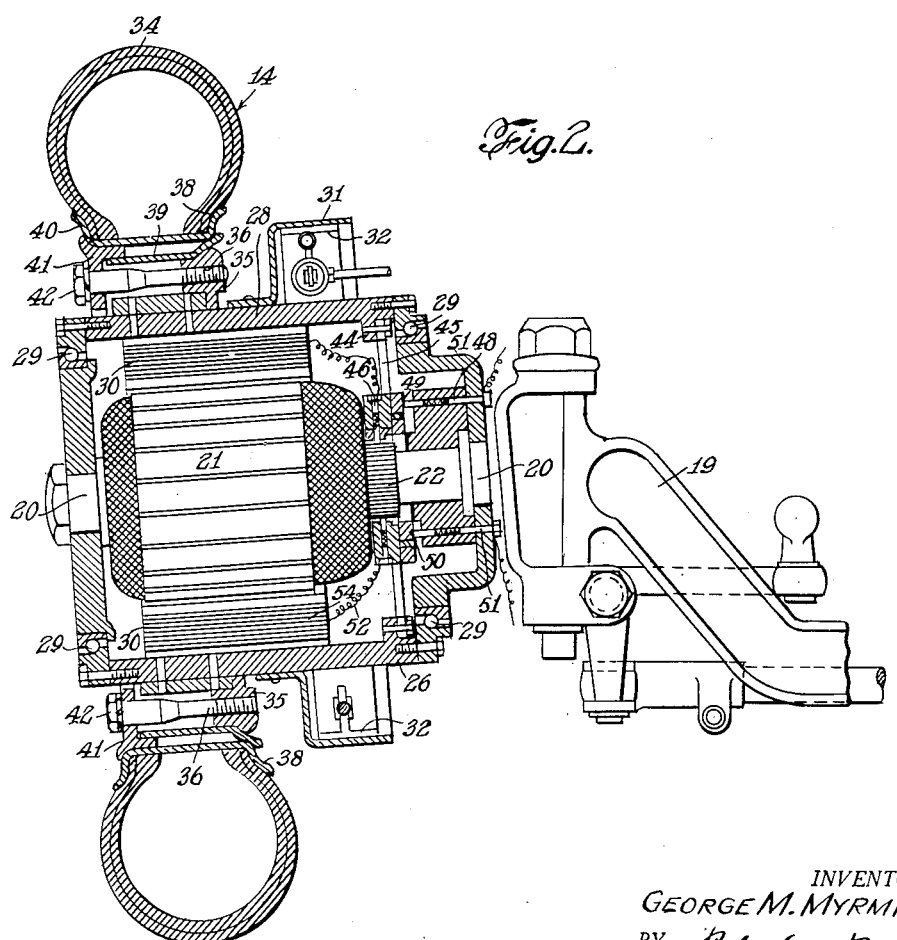
INVENTOR.
GEORGE M. MYRMIRIDES
BY *Peter A. Boeren*
ATTORNEY.

Jan. 8, 1952        G. M. MYRMIRIDES        2,581,551
MEANS FOR POWERING VEHICLES
Filed April 14, 1948        2 SHEETS—SHEET 2
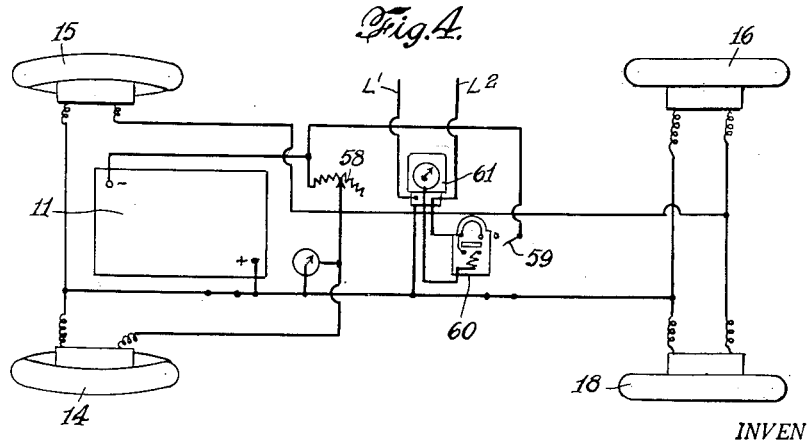
INVENTOR.
GEORGE M. MYRMIRIDES
BY
ATTORNEY.

Patented Jan. 8, 1952

2,581,551

UNITED STATES PATENT OFFICE 2,581,551

MEANS FOR POWERING VEHICLES

George M. Myrmirides, Brooklyn, N. Y.

Application April 14, 1948, Serial No. 20,969

1 Claim. (Cl. 172—287)

This invention relates to vehicles and to means for powering same and more particularly to apparatus and devices for applying independent torques to various wheels of the vehicles by electric motors built into the hub portions of such wheels.

One object of the invention is to provide an improved device or apparatus of this kind which has a minimum of moving parts and is free from rotating shafts.

Another object is to provide means whereby all wheels may derive their power from the same source and yet the slippage of one or more wheels will not appreciably lessen the power available to other wheels in good traction contact with the ground.

Other objects of the invention are to provide an improved device of this kind to effect simplicity and efficiency in such apparatus and to provide an extremely simple device or apparatus of this kind which is economical, durable, and reliable in operation, and economical to manufacture and install.

Still other objects of the invention will appear as the description proceeds; and while herein details of the invention are described in the specification and the claim, the invention is not limited to these and many and various changes may be made without departing from the scope of the invention.

The invention features for the accomplishment of these and other objects are shown herein in connection with a vehicle which briefly stated, includes a vehicle having a source of current movable therewith and a plurality of traction wheels each independently powered by said source. The powering of the wheels is accompolished by electric motors connected in parallel to said source each motor comprising a non-rotary armature associated with a field housing rotatably mounted about the armature and carrying the wheel or tire.

In the conventional gasoline powered vehicle it is impractical to provide a separate engine for each wheel and, as a consequence, differential gears are necessary to prevent excessive wear and tear on the tires of the wheels of the vehicle when rounding curves and the like. When one of the traction wheels does not make firm contact with the ground, due to ice or actually leaving the road, the remaining traction wheels cannot exert their full effect, if any. With my vehicle if any traction wheel be allowed to spin the power to the other wheels is diminished only by the no-load losses in its motor plus, of course, any actual tractive effect of the wheel accomplished by the spinning. Thus as long as any one tractive wheel of my vehicle is on firm ground nearly the entire power available can be used for moving the vehicle. Since the times most likely for bad driving conditions are when the temperature is low single motors may be considerably overloaded without damage to the motor.

In the accompanying drawing showing, by way of example, one of many possible embodiments of the invention, Figure 1 is a side elevation of the vehicle.

Figure 2 is a sectional view of one of the wheels, the section being taken substantially along the line 2—2 of Figure 1 looking in the direction of the arrows of said line.

Figure 3 shows the back of the wheel of Figure 2, and

Figure 4 is a wiring diagram of the power control for the motors of the wheels.

The invention comprises an automobile 10, having a battery 11 under the hood 12. Mechanically independent traction wheels 14, 15, 16 and 18 are mounted on the chassis 19 of the automobile for engagement with the ground. The number of traction wheels is preferably four, as shown, although any number from one on up may be used. Said chassis comprises a non-rotatable shaft 20 for each of said wheels with an armature 21 and commutator 22 therefor secured fast on the shaft at the inner and outer end portions thereof to form a hub 26 with a hollow cylinder 28 in axial alinement with the shaft, and having the inner and outer end portions of the cylinder mounted for rotating on said caps, as by ball bearings 29. Field magnet poles 30 secured on the interior face of the cylinder are adapted to cooperate with the armature, whereby the cooperation may produce rotation of the cylinder. A brake drum 31 is secured to the exterior face of the cylinder and an expansive brake shoe 32 is employed in a conventional manner between the cylinder and the drum for engagement with the latter.

A tire 34 is secured to the cylinder through the means of a plurality of fixed lugs 35 projecting radially from and secured to the exterior of the cylinder and provided with threaded holes 36 axially parallel to the shaft, and having outwardly facing shoulders 38. A band 39 around the lugs is in engagement therewith and extends outwardly parallel to the cylinder, carrying a tire rim 40 engaging the exterior face of the band. Wedge lugs 41, having a wedge portion between the rim and the band, tighten the rim against the band, and in turn against the fixed lugs by bolts 42 passing through the wedge lugs and in threaded engagement with the fixed lugs.

A spider 44 having the arms 45 thereof secured to the interior of the cylinder outer of the inner plate is adapted to rotate with the cylinder around the commutator, and is provided with brushes 46, 48 mounted on the spider and engaging the armature. Concentric slip rings 49, 50 on the inner face of the spider and insulated from each other, in cooperation with brush means 51 passing through the inner cap and engaging the rings, conduct current from the exterior to the rotary spider.

It is preferable that the resulting motor of the hub be of the series type, consequently one lead 52 of the field winding 54 is connected to the brush 48, the other field lead 55 connected to the slip ring 50, and the brush 46 to ring 49.

The motors all may be connected in parallel as shown in Figure 4 and the flow of current controlled by a rheostat 58 which also serves as an on-and-off switch.

The battery 11, which may be made up of any suitable number of lead or nickel storage cells, may be charged by means of a suitable source of current $L_1$ $L_2$ with the lever of the rheostat 58 in off position, and charging switch 59 closed. A conventional relay cut-out 60 opens the charging circuit when, or a predetermined length of time after, the battery voltage reaches a particular value as indicated by the meter 61.

The invention claimed is:

An automobile wheel and mounting comprising a non-rotatable shaft, an armature and commutator therefor secured fast on the shaft, inner and outer circular housing caps secured fast on the shaft at the inner and outer end portions thereof, a hollow cylinder in axial alinement with the shaft and having the inner and outer end portions of the cylinder mounted for rotating on said caps, balls between the caps and end portions, magnet poles secured on the interior face of the cylinder and adapted to cooperate with the armature, means for mounting a tire on the cylinder, a spider having the arm thereof secured to the interior of the cylinder outwardly of the inner plate and adapted to rotate with the cylinder around the commutator, brushes mounted on the spider and engaging the armature, concentric slip rings on the inner face of the spider and insulated from each other, and brush means passing through the inner cap and engaging the rings.

GEORGE M. MYRMIRIDES.

REFERENCES CITED

The following references are of record in the file of this patent:

UNITED STATES PATENTS

| Number | Name | Date |
|---|---|---|
| 1,314,932 | Baker | Sept. 2, 1919 |
| 1,495,788 | Franz | May 27, 1924 |
| 1,747,560 | Weathers | Feb. 18, 1930 |
| 1,861,145 | Sommer | May 31, 1932 |
| 2,273,840 | Dever | Feb. 24, 1942 |
| 2,348,053 | Bowker | May 2, 1944 |

FOREIGN PATENTS

| Number | Country | Date |
|---|---|---|
| 237,733 | Germany | Aug. 29, 1911 |
| 570,518 | France | May 2, 1924 |
| 616,973 | Germany | July 18, 1935 |